July 5, 1966 M. YAMADA 3,259,011

AUTOMATIC SYNCHRONIZING CHANGE-OVER APPARATUS OF SOUND SLIDE PROJECTOR

Filed July 5, 1963

INVENTOR
MASAYOSHI YAMADA

BY *Scrivener & Parker*

ATTORNEYS 3,259,011
AUTOMATIC SYNCHRONIZING CHANGE-OVER APPARATUS OF SOUND SLIDE PROJECTOR
Masayoshi Yamada, 51 Zenpukuji-machi, Suginam-ku, Tokyo-to, Japan
Filed July 5, 1963, Ser. No. 292,835
2 Claims. (Cl. 88—28)

This invention relates to the change-over apparatus in a sound slide projector, which can synchronize the sound and the picture automatically, correcting immediately and automatically the discrepancy between them even when the sound lags greatly behind, or goes much faster than, the picture, by using a plural number of signals of different frequency as the change-over signal.

In sound slide projectors, in order to send slides forward there has been adopted a method, in which a tape is used, on the upper half of which is recorded the voice of explanation and on the lower half of which are recorded the change-over signals, and frames of slide or strip-film are sent forward one after another by the change-over signal, being made corresponding with the voice of explanation. As this method does not give any consideration to the synchronization of the sound and the picture, however, the voice often lags behind or goes faster than the picture by more than one frame. In such cases, the discrepancy between the voice and the picture cannot be corrected, unless the sound and the picture are adjusted with each other by stopping temporarily the strip-film, the slides or the tape by manual handling. Moreover, when the operator does not know well the correspondence between the picture and the explanation of it, often he cannot even know if there is any discrepancy between the picture and the sound. These are some of the defects of the conventional method.

The main characteristics of this invention are that the apparatus is so constituted that a necessary number of more than two kinds of signals of specific frequency are recorded on a recording medium on which the voice for explanation is recorded and that the control on the strip-film or slide-sending mechanism is done by the signal generated from the recorded signals mentioned above.

Figure 1:
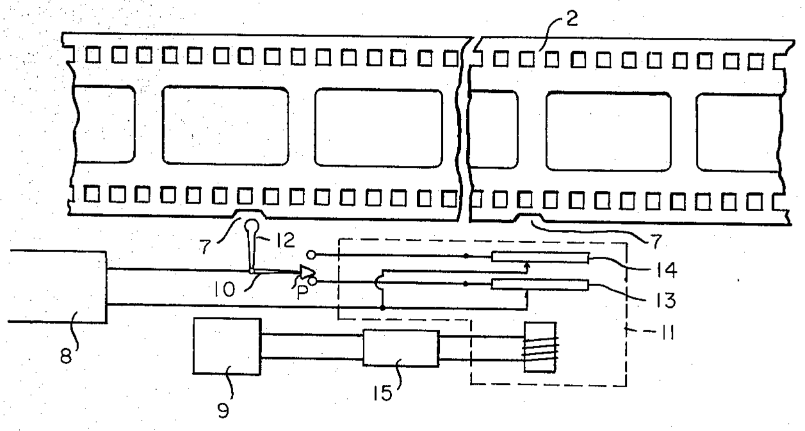
Figure 2:
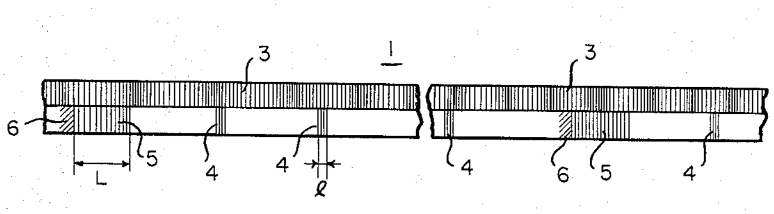

FIG. 1 shows one example of the relation between the film and the frequency discrimination apparatus when the strip-film is used in the automatic synchronizing change-over apparatus of the present invention. FIG. 2 illustrates one example of the film-sending signals recorded on the tape.

In the above-mentioned figures it is shown that the main control signals 4, 5 are recorded with given intervals and lengths on the lower track of the tape 1 on the upper track of which the voice for explanation is recorded. The length of time *l* of the recorded main control signal 4 is so fixed that it generates the change-over signal for movement of the tape during the time (*t*) required to move the film strip 2 by one frame and advances the film 2 forward by one frame in accordance with the voice for explanation 3, while the length L of the recorded main control signal 5 is so fixed that it generates the change-over signal, along with the movement of the tape 1, during the time several times as long as the time *t* mentioned above. And also, the synchronizing signal 6, which generates a signal having a frequency that is different from that of the signals generated from the main control signals 4, 5, is recorded after the main control signal 5. The film-advancing mechanism 8 is so constituted that, whenever it receives the signal, it advances the film 2 forward by one frame, and between the said film advancing mechanism and the change-over signal receiving head 9 the micro-switch 10 and the frequency discrimination equipment 11 (for example: reed relay) are provided, and a given number of grooves 7 are formed along the lower edge of the film 2 with given intervals. When the switch actuator 12 is opposite the groove 7 (as shown in FIGURE 1), microswitch 10 engages contact P as shown and signals responsive to the main control signals 4, 5 are transmitted from reed 13 to the film advancing mechanism 8. When the switch actuator 12 is pivoted by the film 2 in the counterclockwise direction, reed 14 transmits to the film-advancing mechanism 8 signals that are a function of the synchronizing signals 6. Amplifier 15 is connected between the change-over signal receiving head 9 and the solenoid coil of the frequency discrimination means 11. Consequently, signals on tape 1 detected by head 9 are amplified by amplifier 15, and operate the reeds 13 and 14. Depending on the position of switch 10, either the control signals 4, 5 or the synchronizing signals 6 are transmitted to the film-advancing mechanism 8.

As the automatic synchronizing change-over apparatus of the present invention is so constituted that the main control signal 4, which generates signals during the time shorter that the time *t* required for film 2 to move by one frame, and the main control signal 5, which generates signals during the time several times as long as the time *t*, are recorded on the tape 1 with necessary intervals between them, and after the main control signal 5 the synchronizing signal 6 is recorded which generates signals having the frequency different from that of the main control signals 4, 5, and that the signals generated by the main control signals 4, 5 and the signals generated by the synchronizing signal 6 can be selected properly in accordance with the movement of the film 2 and the different frequency is used for signals which send current to the film advancing mechanism by the relative positions of the tape 1 and the film 2, the discrepancy between the sound and the picture can be corrected automatically, even if there should be some derangement in the relation between the tape 1 and the film 2 and the discrepancy between the sound and the picture should be great.

The details of operation will be described next:

(I) *When the picture lags behind the sound.*—As the main control signal 4 generates change-over signals *a*, along with the movement of the tape 1, only during the time *t* required to move the film 2 by one frame, every time when the main control signal 4 comes to the change-over signal receiving head 9 the film 2 moves by one frame. And as the main control signal 5 generates change-over signals *a* during the time several times as long as the time *t*, the film 2 moves by several frames at one time, when the main control signal 5 comes to the head 9. Therefore, when the tape 1 is preceding the film 2, the film 2 moves promptly as soon as the main control signal 5 comes to the head 9 and it continues to move until the actuator 12 gets inside the groove 7, and, once the actuator 12 gets inside the groove 7, the micro-switch operates and the contact P is changed from reed 13 to 14 and then the signals *a* generated by the main control signal 5 cannot send the current to the film-advancing mechanism 8, and so the film 2 stops its movement. And, when the tape 1 proceeds and the synchronizing signal 6 comes to the head 9, the film 2 moves by one frame, as the current is sent to the film-advancing mechanism by the signals *b* generated by the synchronizing signal 6, and as soon as the actuator 12 gets out of the groove 7, the contact P is changed from reed 14 to 13 and the film 2 stops. Therefore, if the position of the groove 7 and the position of the synchronizing signal 6 recorded on the tape are made related with each other, the lag of the picture is corrected completely when the film 2 was moved by one frame by the synchronizing signal 6, and the picture and the sound are to be synchronized completely thereafter.

(II) *When the sound lags behind the picture.*—When the film 2 is preceding the tape 1, the actuator 12 gets inside the groove 7 earlier, and so the signal *a*, generated every time when the main control signals 4, 5 recorded on such portions of the tape 1 as lagged behind the film 2 comes to the head 9, cannot set in motion the film-advancing mechanism 8. And, when the tape 1 proceeds and the synchronizing signal 6 comes to the head 9, the signal *b* is generated and the film 2 moves by one frame, and therefore the picture and the sound are to be synchronized completely.

As is shown clearly in (I) and (II), the discrepancy between the sound and the picture is automatically corrected, and if the length L of the main control signal 5 be made suitably longer, the discrepancy that may possibly take place between the tape 1 and the film 2, can be remedied automatically if within a given limit.

The description given above is of the case in which the signals having one kind of frequency are used as the synchronizing signal. If a plural number of signals having different frequency are used as the synchronizing signal, or if more than two kinds of synchronizing signal are combined with one another and more sychronization can be achieved by the said combination, the period of synchronization can be made much longer, the synchronization can be done almost always during the projection, and the same synchronization as given to the strip-film can be given to the slides, if proper grooves are given to the said slides.

As mentioned above, the frequency discrimination apparatus may be operated either by a mechanical embodiment in which a micro-switch is used with grooves having been formed at the necessary points on the film or slides, or by an electrical embodiment in which photo electric tubes are used with black or white marks having been given at the necessary points on the film or slides. And, of course, various kinds of equipment may be adopted as frequency discrimination apparatus, or it may be so constituted that frequency discrimination apparatus other than the amplifier is not needed, which is to be so constructed as to have better sensibility for a plural number of specific frequency. The descriptions given above are of the cases in which magnetic recording tape is used, while, in the case of disks of stereo also, similar effect can be achieved, if one channel is used for voice and the other for control signals.

As the automatic synchronizing change-over apparatus can correct the discrepancy in the relation between the sound and the picture, however great the said discrepancy may be, correct synchronization can be achieved of the picture and its explanation, even when those who know nothing of the explanation handle the machine, and the apparatus has also such excellent points as simple mechanism and cheap manufacture.

What I claim is:

1. Apparatus for synchronizing a pair of longitudinally traveling picture-bearing and sound-bearing media, said sound bearing medium (1) having recorded thereon an explanation voice signal (3), a pair of main control signals (4, 5) each consisting of longitudinally recorded signals, one of said main control signals (4) having a length (*l*) that corresponds with the time for one frame change (*t*) of the picture bearing medium (2), and the other of said main control signals (5) having a length (L) that is several times longer than that of the first main control signal (4), said sound bearing medium having also recorded thereon a synchronizing signal (6) having a different frequency than that of said main control signals, said picture bearing medium containing also longitudinally spaced synchronizing mark means (7) corresponding to the synchronizing means (6) recorded on said sound-bearing medium;

frequency discriminating means (11) including first frequency responsive means (13) responsive to said main control signals (4, 5) for generating first film advancing signals, and second frequency responsive means (14) responsive to said synchronizing signals (6) for generating second film advancing signals;

signal-responsive means (8) for advancing the film (2);

switch means (10) having a first position (P) operable to connect said first frequency-responsive means (13) with said film advancing means (8), and a second position operable to connect said second frequency responsive means (14) with said film advancing means;

and means (12) responsive to the instantaneous position of said synchronizing mark means (7) for displacing said switch means (10) from said first position to said second position.

2. Apparatus as defined in claim 1 wherein said means responsive to said synchronizing mark means comprises a switch actuator (12) arranged adjacent the picture-bearing medium said picture-bearing medium containing a plurality of longitudinally spaced grooves (7) for cooperation with said switch actuator to operate the switch between said first and second positions.

References Cited by the Examiner

UNITED STATES PATENTS

| | | | |
|---|---|---|---|
| 2,475,439 | 7/1949 | Waller et al. | 88—28 X |
| 2,693,127 | 11/1954 | Ortman | 88—28 X |
| 3,181,421 | 5/1965 | Nimke et al. | 88—28 |

NORTON ANSHER, *Primary Examiner.*

WILLIAM MISIEK, *Examiner.*